(12) United States Patent
Gort-Barten (10) Patent No.: US 10,362,900 B2
(45) Date of Patent: Jul. 30, 2019

(54) TOASTER

(71) Applicant: Leslie Gort-Barten, West Sussex (GB)

(72) Inventor: Leslie Gort-Barten, West Sussex (GB)

( * ) Notice: Subject to any disclaimer, the term of this patent is extended or adjusted under 35 U.S.C. 154(b) by 0 days.

(21) Appl. No.: 15/116,720

(22) PCT Filed: Feb. 16, 2015

(86) PCT No.: PCT/GB2015/000049
§ 371 (c)(1),
(2) Date: Aug. 4, 2016

(87) PCT Pub. No.: WO2015/118292
PCT Pub. Date: Aug. 13, 2015

(65) Prior Publication Data
US 2016/0345775 A1 Dec. 1, 2016

(30) Foreign Application Priority Data

Feb. 7, 2014 (GB) ..................... 402187.7

(51) Int. Cl.
*H05B 1/02* (2006.01)
*A47J 27/21* (2006.01)
*A47J 37/08* (2006.01)

(52) U.S. Cl.
CPC ............ *A47J 37/0835* (2013.01); *H05B 1/02* (2013.01); *H05B 1/0261* (2013.01); *A47J 27/21133* (2013.01)

(58) Field of Classification Search
CPC ... A47J 27/21133; A47J 37/0835; H05B 1/02; H05B 1/0261
USPC ........ 99/337, 325, 328, 329 R, 329 RT, 331, 99/385
See application file for complete search history.

(56) References Cited

U.S. PATENT DOCUMENTS

| | | | | |
|---|---|---|---|---|
| 2,031,656 A | * | 2/1936 | Jeppsson ............. | A47J 37/0814 337/104 |
| 3,625,714 A | * | 12/1971 | Hitzeroth et al. .. | A47J 37/0814 220/4.02 |
| 4,755,656 A | * | 7/1988 | Charlesworth ..... | A47J 37/0835 219/492 |
| 2007/0139844 A1 | * | 6/2007 | Horey ..................... | H02H 3/08 361/104 |
| 2011/0245977 A1 | * | 10/2011 | Zhang ..................... | A47J 37/08 700/275 |

FOREIGN PATENT DOCUMENTS

GB 2193086 * 2/1988

* cited by examiner

*Primary Examiner* — Dana Ross
*Assistant Examiner* — Joseph W Iskra
(74) *Attorney, Agent, or Firm* — Stites & Harbison, PLLC; David W. Nagle, Jr.; Terry L. Wright (57) ABSTRACT

A toaster includes a housing, with a first cavity for toasting bread and a second cavity outside of and separate from the first cavity. The housing also includes at least one slot for receiving bread into the first cavity, and the first cavity is provided with heating elements to toast the bread. The toaster also includes control circuitry for the heating elements with a thermal fuse. There is a first saturation temperature range for toasting bread and a second saturation temperature range which corresponds to a runaway condition. The thermal fuse is positioned in the second cavity and has an actuation temperature between the first saturation temperature range and a the second saturation temperature range, as measured in the second cavity.

5 Claims, 7 Drawing Sheets

TOASTER

The invention relates to a toaster with a safety cut-out.

Toasters are intended to be attended appliances and users are instructed that an unattended toaster should be left unplugged. However even an attended appliance can potentially enter a runaway condition if, for example, the actuating lever is jammed in the on position by a falling product garage door. In such a condition there is no visual cue that the toaster is in runaway until it ignites.

Toasters have been provided with various solutions to deal with this risk of overheating. Some sensors such as infra-red sensors are not suitable as their performance is adversely affected by a build-up of sugars fat on the sensor due to the fats and sugar in the toast vaporising.

Moreover, toasters are used in a wide variety of conditions. It is known that toasters have to operate reliably in sub-zero conditions to cope with use in unheated or poorly heated rooms in cold climates in Winter as well as in very hot conditions with ambient temperatures of over 40° C. in hot climates or a busy kitchen. Apart from ambient conditions, the type of bread will also affect the internal temperature of the toasting cavity with variations of over 10° C. being seen for the same ambient conditions. Toasting white bread is very different to toasting rye bread, for example.

The operating temperature of the toaster will also be affected by the number of heating elements in operation. Commercial toasters have for some time had individually actuatable heating elements and bagel settings in which only half of the elements are actuated are also now common on domestic toasters.

The other main factor affecting the operating temperatures of the toaster is its location. Many toasters are located in kitchens in an area with reduced airflow Other toasters will be used in an open environment with good airflow.

An example of a known proposal is given in CN201946954 U, which discloses toaster protective circuit which has a function that when a handle is tightly clamped and cannot bounce, a thermal fuse can be disconnected by other circuit modules, so as to stop power supply and working. This document does not address the problem of thermal runaway.

Due to the wide variety of factors affecting operating temperature of the toaster, it has not been possible to use temperature cut outs to prevent a runaway condition as the switches are actuated too often when it is not desired. This would lead to unnecessary product returns and significant reputational damage.

It has further been proposed to use a timer circuit for the safety cut-out. These are currently the most widely used solution but there have been problems with circuit failures. Additionally some designs of actuator on pop up toasters can become jammed in the on position leading to simple, reliable timer circuits not cutting out.

The present invention therefore seeks to provide a toaster with a safety cut-out that can reliably detect thermal runaway in a toaster.

According to the invention there is provided a toaster with a housing, in which housing there is provided a first cavity for toasting bread and a second cavity, the housing having at least one slot for receiving bread into the toasting cavity, which first cavity is provided with heating elements adapted to toast bread in use, wherein there is a first saturation temperature range for toasting bread in a predetermined slot or number of slots and a second saturation temperature range corresponding to the runaway condition, wherein there is a difference in temperature in the second cavity between the first and second saturation temperature ranges, the toaster being provided with a thermal fuse, wherein the thermal fuse has an actuation temperature range, the bottom of the range lying above the first range and the top of the range lying below the second range.

Preferably the fuse in the second cavity. Alternatively, the fuse can be surface mounted on a baffle plate adjacent to the first cavity, which fuse can be in the first or second cavity.

Preferably, the temperature difference between the top of the first saturation temperature range and the bottom of the second saturation temperature range, $\Delta T$ is greater than 20 C. Preferably, $\Delta T$ is substantially in the range of 20 to 30 C. Preferably, the thermal fuse is located at a lower point of the second cavity. Preferably the fuse is surface mounted to a baffle plate in or forming part of the second cavity.

In the preferred location at the lower part of the second cavity, the location takes a longer period of time to reach stabilisation temperature during runaway, compared to other locations within the toaster. This avoids the problem that if the location got hot, too quickly, then there would be a problem with nuisance tripping and reduces the life of the fuse and hence the product.

This location also cools down quickly, due to the low thermal mass of the baffle plate, which helps keep the normal toasting stabilisation temperature lower then runaway stabilisation temperature, i.e. nuisance tripping is prevented.

An exemplary embodiment of the invention will now be described in greater detail with reference to the drawings in which.

There are two main types of toaster currently in commercial production, namely for commercial use and for domestic use. Commercial toasters are designed to be capable of being used almost continuously and typically will have a metal construction. Commercial toasters usually have two, three or particularly four or six slots and also have individually actuatable heating elements so that one, two, three, four or six slots (for a six slot toaster) can be actuated at any time. Commercial toasters are often provided with mechanical timers and will usually have a mechanical lever to eject to the toast.

Domestic toasters usually have a plastic or metal and plastic construction and are provided with an electrical timer on a PCB and have a pop up mechanism to eject the toast at the end of the cycle. A description of a domestic toaster having a pop up mechanism is provided below.

Toasters are intended to be used as attended appliances. In the event of a component failure, it is possible for the toaster to enter a runaway condition where the elements are not turned off. In multi-slot toasters, the runaway condition could arise only on some slots and not on others. This runaway condition in turn can represent a fire risk in an unattended toaster.

Figure 1:
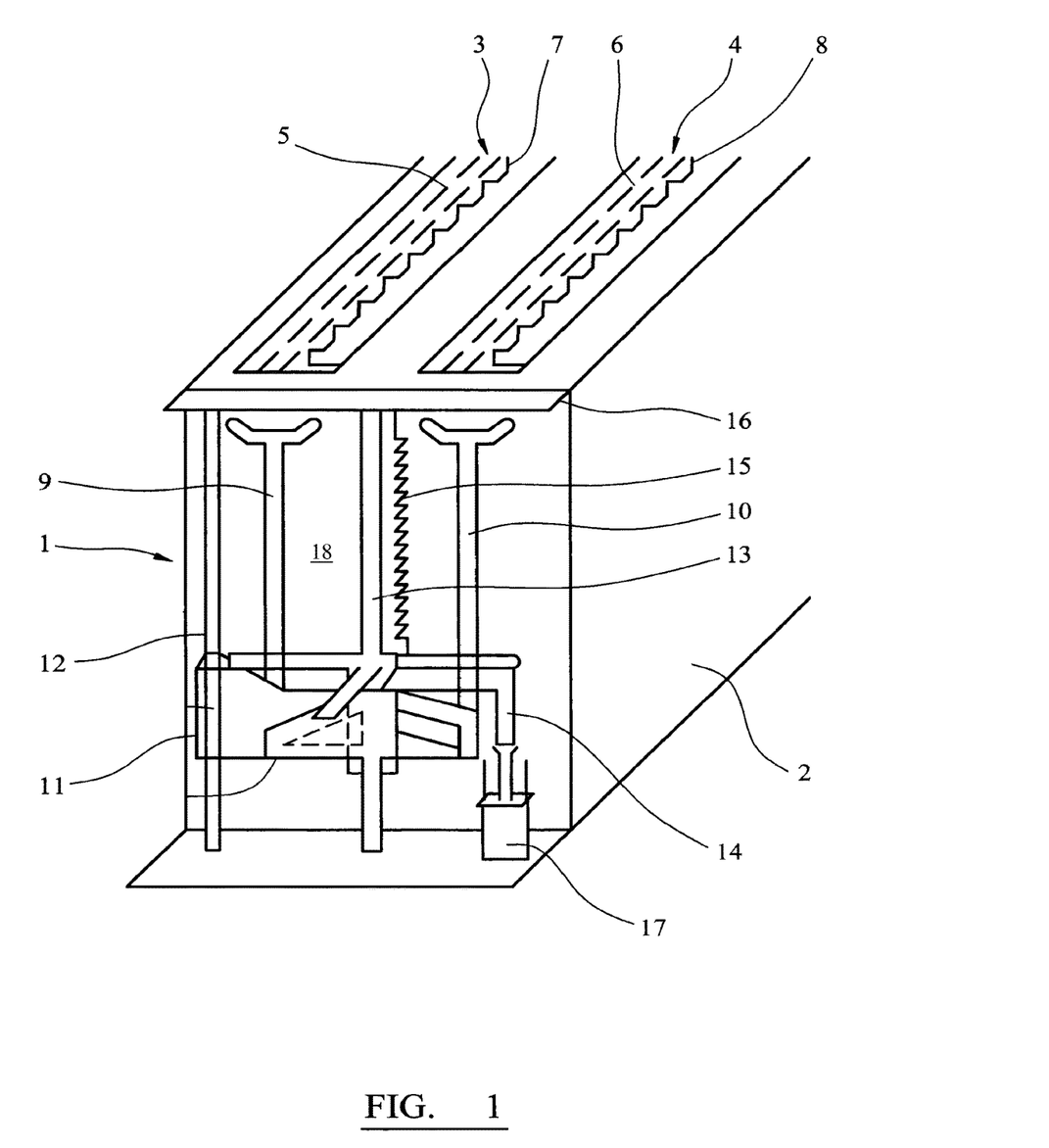
FIG. 1 shows a schematic plan view of a toaster

FIG. 1 shows schematic plan view of a toaster 1, without the housing being present, comprising a main housing 2 having first and second bread or toasting cavities 3,4, which may be collectively referred to as the first cavity. The first cavity generally have the form of a rectangular tube so that bread may be inserted at the top end and crumbs can fall out the bottom end. Heating elements 5,6 are arranged/each bread cavity 3,4 and in use are adapted to toast a piece of bread located on a respective read support 7,8. Each bread support 7,8 comprises a plurality of alternating metal supports and extends through a respective slot 9,10. The bread supports are also supported at the end of the bread cavities 3,4.

The two bread supports 7,8 are attached to a carriage 11, which is adapted to slide on two vertical rods 12,13, the lower ends of which are mounted on the base of the housing 2 and the upper ends of which are attached to a flange 16 extending from tree upper surface of the toaster. The rod 13 is located substantially equidistantly from the two bread cavities 3,4. A spring 15 is attached to both the flange 16 and the carriage 11, so that the carriage is urged into a raised position in which the bread or toast is raised above the upper surface of the housing. The rods, springs and flange are located in a second cavity within the overall housing of the toaster when fully assembled. The second cavity may be defined by the toaster housing or may be a distinct space within the housing. In this exemplary embodiment, and as shown in FIG. 1, a baffle plate 18 is provided that separates the first cavity and the second cavity.

The switch 17 for actuating the timer, pop-up and heating elements comprises two pairs of upstanding elements having opposing contacts at their distal ends. The downward projection 14 which is integral with the carriage 11, in use, will force the respective contacts together when it is inserted between the two pairs of upstanding contact arms. As the upstanding contact arms are resilient, the downward projection is urged away from the lowest position by the resilience of the contact arms. The carriage 11 is held in the lower position against the force generated by the spring by means of an electromagnet, which is actuated by the closing of the contacts.

There are surprisingly a large number of variables in the making of toast. Toaster heating elements are generally designed to operate at a particular wattage due to the necessity to cause the Maillard reaction on the toast surface to make toast. However, different types of bread behave differently in the same toaster due to differing water and sugar content. A number of other factors also affect the toasting process such as the location of the toaster in a room and the surrounding conditions such as whether the toaster is used in a corner of a kitchen or in a white, open ventilated space. There is also a variation in the output of heating elements and supply voltage as well as the ambient temperature. The temperature in a toasting cavity can therefore vary significantly from around 120 C up to 200 C.

A further complication arises due to the individual actuation of the heating elements. For example, a two slot toaster may be used with both slots actuated and one slice of bread or a six slot toaster could be used with all six slots actuated and only one slice of bread. These complications and variability has resulted in manufacturers having a technical prejudice, rejecting thermal cut outs as impracticable.

Figure 2:
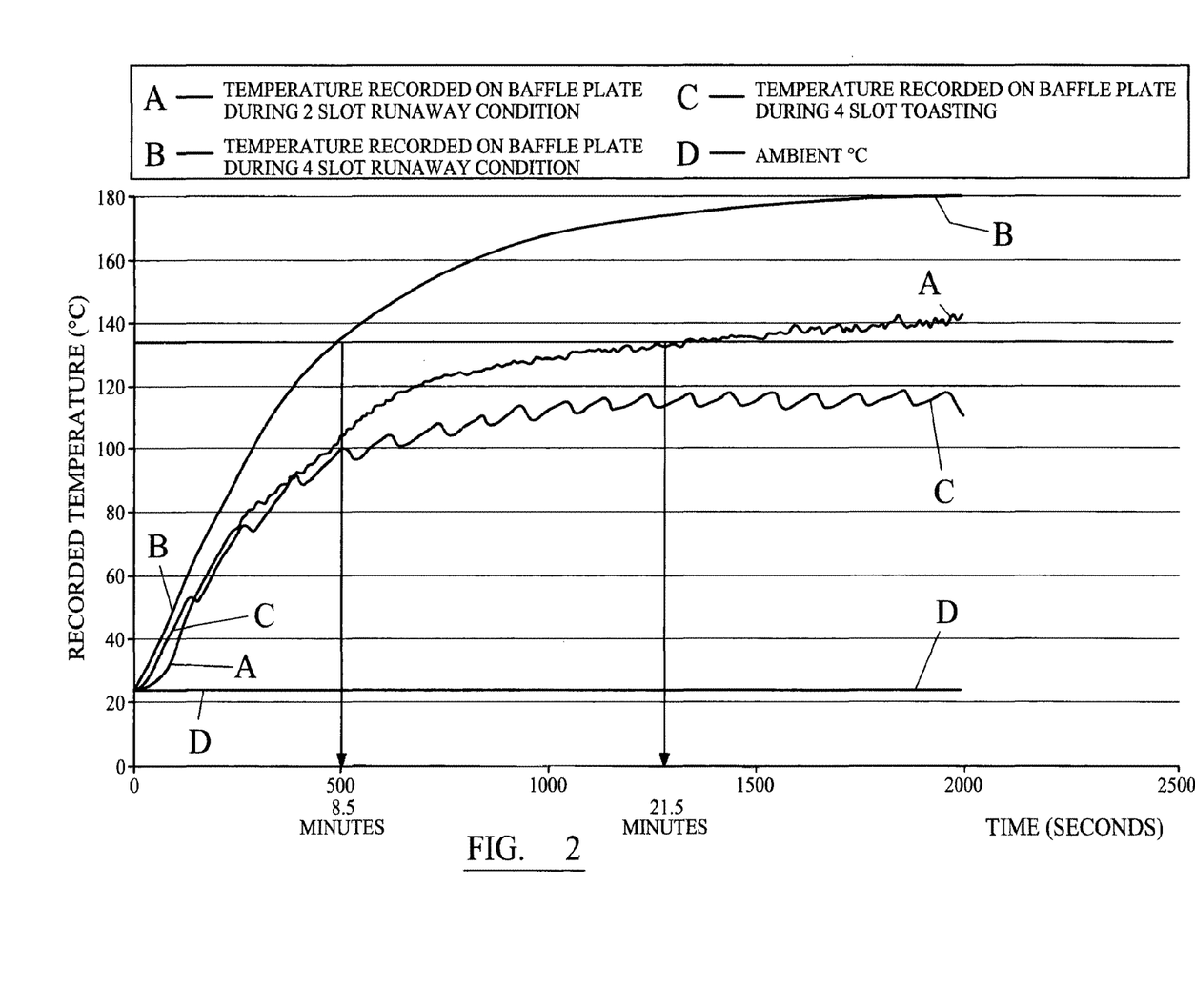
FIG. 2 shows a graph of recorded temperature against time

FIG. 2 shows a graph of recorded temperature against time for a 4 slot toaster showing the temperature recorded on the baffle plate of the toaster during a 2 slot thermal runaway and during 4 slot toasting. As can be seen for approximately ten minutes of continuous operation there is no temperature difference between the two conditions. Thereafter a small gap opens up but remains within the uncertainty limit of the toaster cavity temperature in normal use. A thermal cut out in these circumstances would be expected to trip during normal use with a high frequency.

Figure 3:
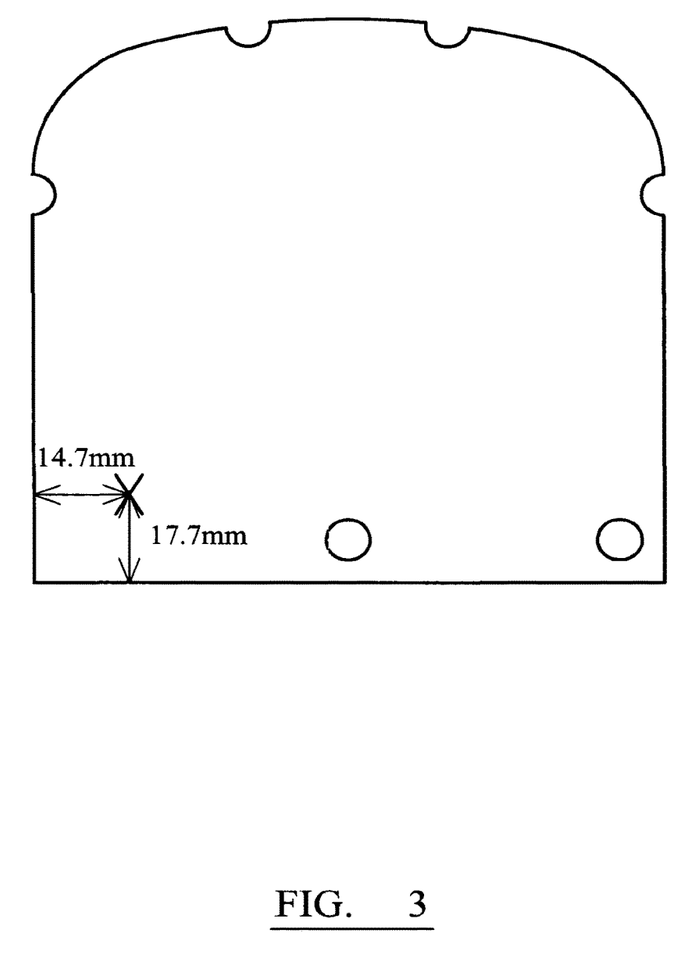
FIG. 3 shows a fuse location

FIG. 3 shows a particularly preferred embodiment of the invention in which a thermal fuse is mounted on an inner baffle plate surface in the second cavity of the toaster housing. In use, the second cavity of the housing inevitably warms up but due to heating losses due to convection and radiation in the first cavity, the temperature in the second cavity is more uniformly distributed than in the first cavity.

In the first cavity the heating elements provide localised high temperatures that are too inconsistent to be used as a reference point as the average temperature at thermal runaway can be lower than the spot temperatures causing the fuse to trip out early. Fuses operating at higher threshold temperatures are less reliable and would not necessarily be tripped at the appropriate temperature due to the effect of the losses.

In the second cavity, the temperature increase is largely due to conduction from the first cavity and then radiation into the second cavity resulting in a more uniform temperature across the cavity. Typically a baffle plate is provided between the toasting and second cavity which reduces dirt ingress to the second cavity but also limits the temperature of the second cavity. The baffle also makes the temperature of the second cavity increase at a slower rate than the toasting cavity. This difference in temperature profile can also be detected. On certain toasters the Plain End element is always energised, no matter what element combination is selected. So for 4 or 6 slot toasters, if the fuse is to activate when only 2 elements are selected, the fuse needs to be located near this element, so that it can detect the heat and activate.

In the toaster cavity there is a first saturation temperature range for toasting bread reached when the toaster has been in continuous use with bread present for typically around 8 to 10 minutes. After this time, the temperature in the cavity does not increase significantly with time but instead adopts a saw tooth pattern. The range depends on the factors discussed above.

However, in the runaway condition, there is a second saturation temperature range with the range depending on most of the same factors. The second range will be higher than the first range.

Figure 4A:
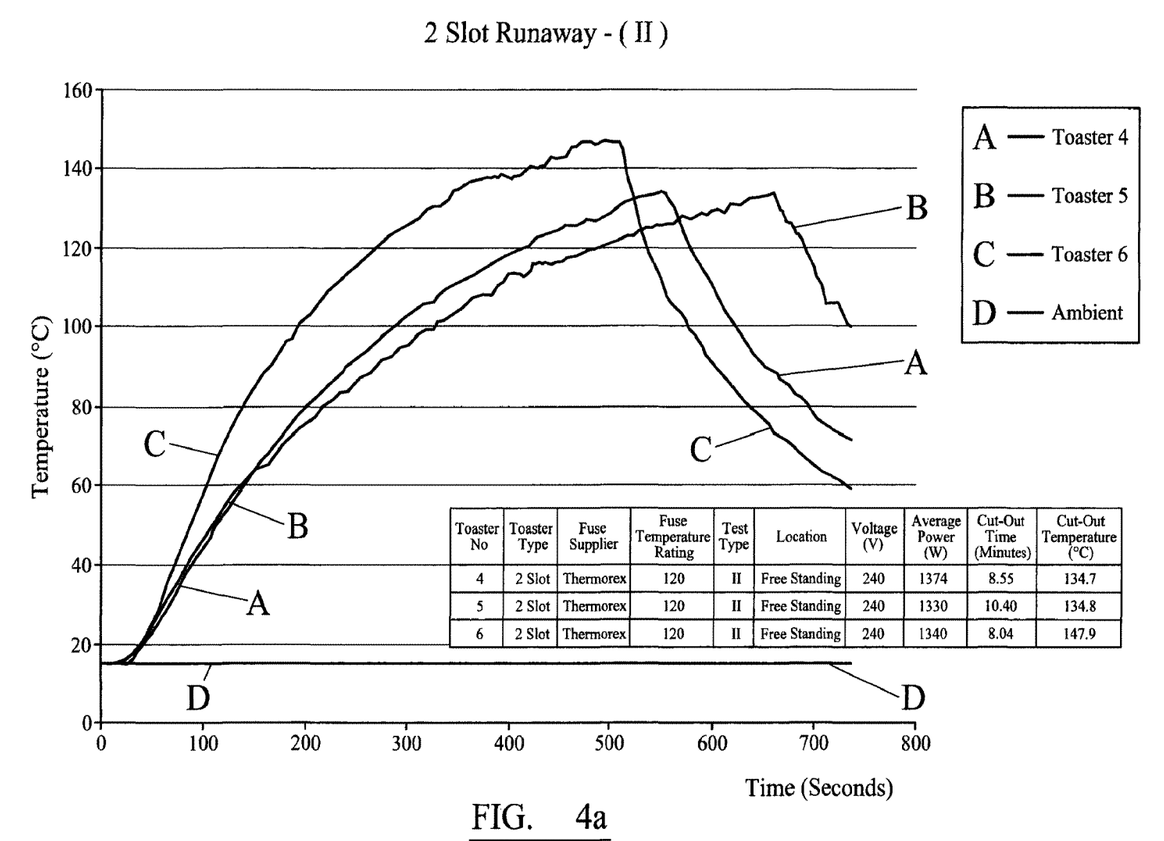
FIG. 4a shows a graph for a 2 slot toaster in runaway condition

It has been found that in the second toaster cavity, where the temperature is not subject to the same localised fluctuations but is more representative of an average temperature in the first cavity, the two ranges do not overlap. It is therefore possible to locate in the control circuitry a thermal fuse having an actuation temperature lying between the two ranges. A preferred location is the inner baffle plate surface or adjacent to but spaced from the exterior wall of the first cavity. The thermal fuse preferably is rated at 145 C or 120 C as it has been found that higher rated fuses are less reliable. It has been found that exposing fuses to temperature above 200 degrees repeatedly reduces the life expectancy of the fuse, due to thermal degradation of the materials it is constructed from FIG. 4a shows graph for a 2 slot runaway. In these examples the same toaster, location and thermal fuse were used. The range of cut out times and temperatures is typical.

Figure 4B:
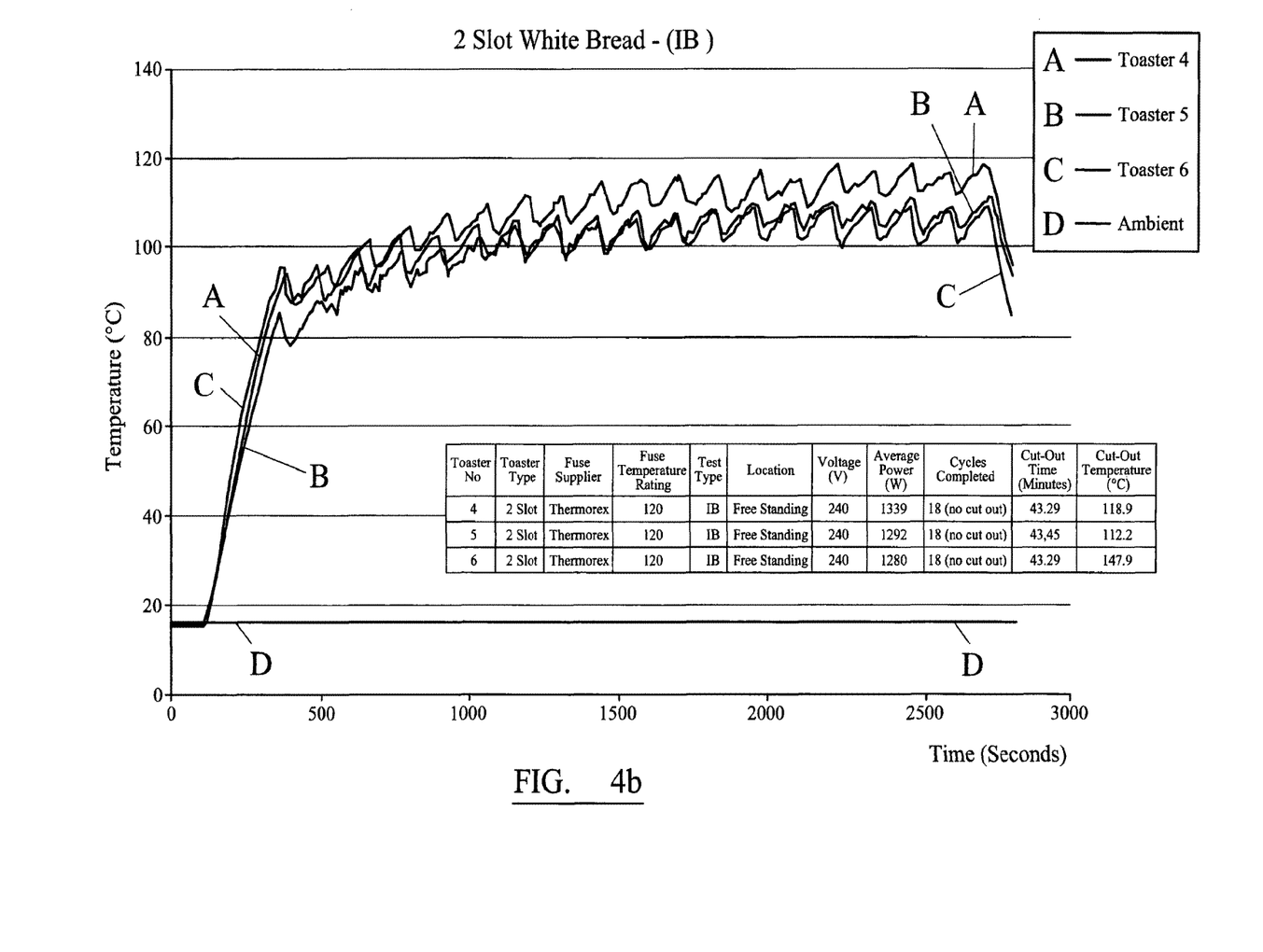
FIG. 4b shows a graph for a 2 slot toaster in normal use

FIG. 4b shows the same toasters, location and fuse type but this time with toast in one slot. As can be seen, the saturation temperature is lower than the saturation temperatures shown for the same toaster in FIG. 4a.

Figure 5A:
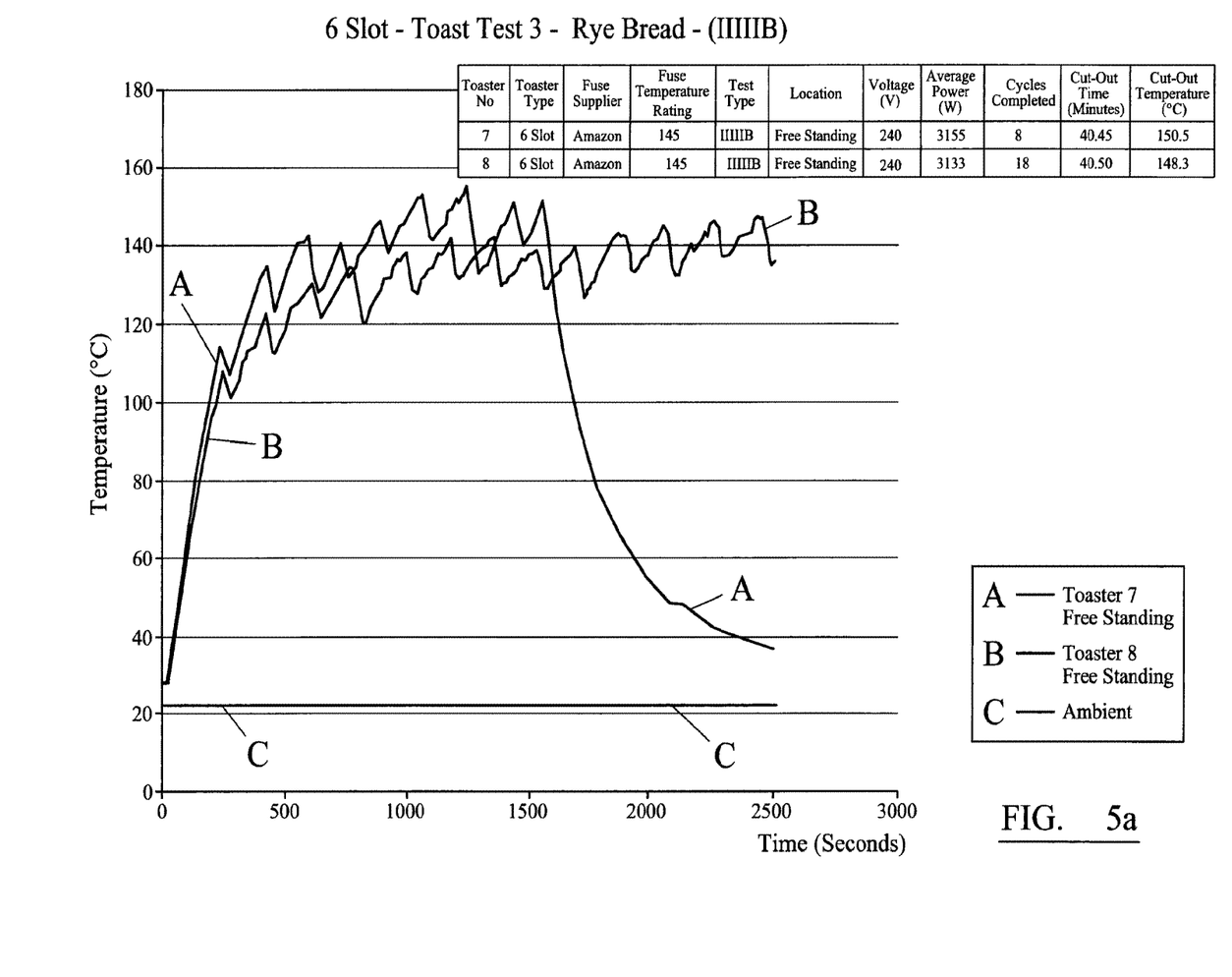
FIG. 5a shows a graph for a 6 slot toaster in runaway condition
Figure 5B:
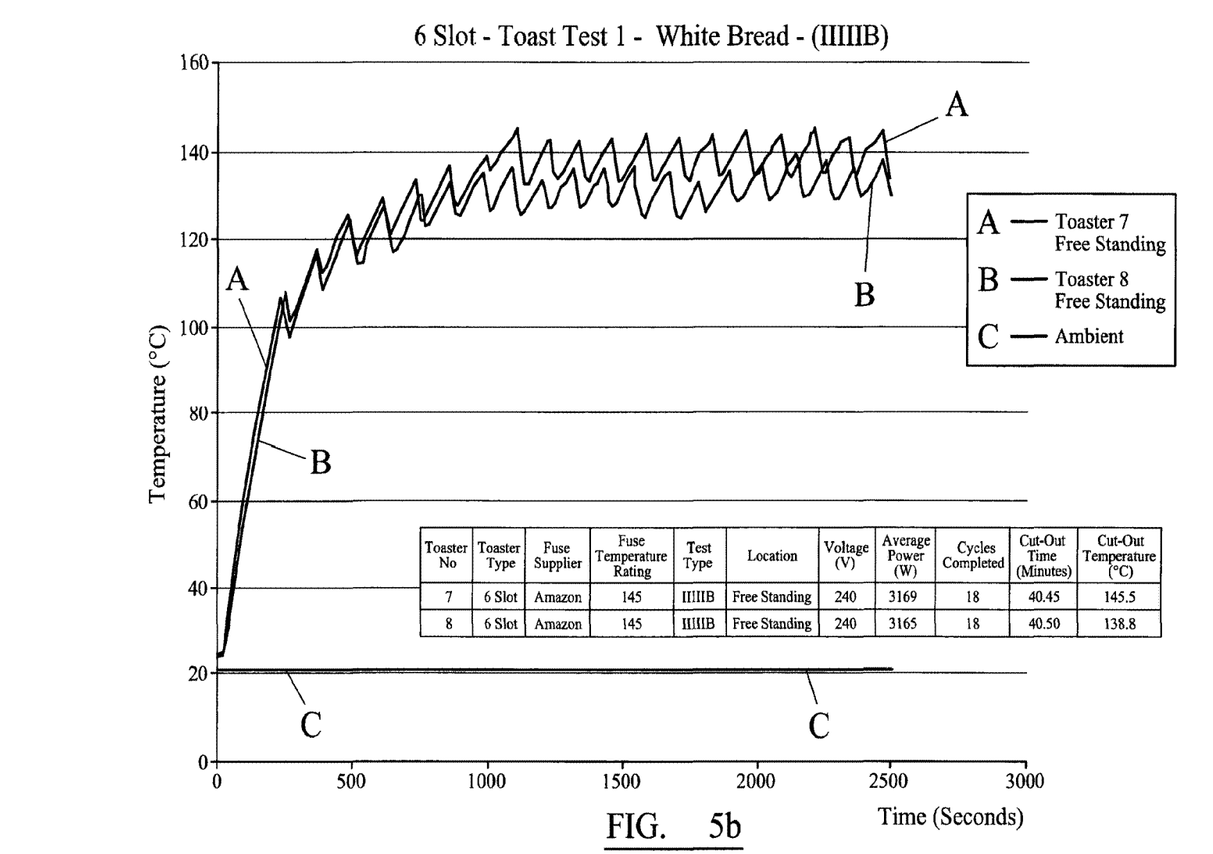
FIG. 5b shows a graph for a 6 slot toaster in normal use

FIG. 5a shows 6 slot minimum runaway—again as with the graphs in FIG. 4, the same toaster, location and thermal fuse were used. FIG. 5b shows the same toasters, this time with a slice of bread.

The invention claimed is:

1. A toaster with a housing, in which housing there is provided a first cavity for toasting bread and a second cavity outside of and separate from the first cavity, a baffle plate being provided between and separating the first cavity and the second cavity, the housing having at least one slot for receiving bread into the first cavity, wherein the first cavity is provided with heating elements adapted to toast bread in use, the toaster being provided with control circuitry for the heating elements that includes a thermal fuse, wherein there is a first saturation temperature range for toasting bread in the at least one slot, wherein the first saturation temperature range, in normal use, does not increase significantly with time after a period of continuous use of the toaster, and wherein a graph of recorded temperature against time during the first saturation temperature range shows a saw tooth pattern, wherein there is a second saturation temperature range, which second saturation temperature range corresponds to a runaway condition, wherein there is a difference in temperature in the second cavity between the first saturation temperature range and the second saturation temperature range, wherein the thermal fuse is positioned in the second cavity, and wherein the thermal fuse has an actuation temperature between the first saturation temperature range and the second saturation temperature range, as measured in the second cavity.

2. The toaster according to claim 1, wherein the difference in temperature between a top of the first saturation temperature range and a bottom of the second saturation temperature range, $\Delta T$, is greater than 20° C.

3. The toaster according to claim 1, wherein the difference in temperature between a top of the first saturation temperature range and a bottom of the second saturation temperature range, $\Delta T$, is substantially in the range of 20 to 30° C.

4. The toaster according to claim 1, wherein the thermal fuse is located at a lower point of the second cavity.

5. The toaster according to claim 1, where the period of continuous use of the toaster is at least 8 minutes.

* * * * *

UNITED STATES PATENT AND TRADEMARK OFFICE
CERTIFICATE OF CORRECTION

PATENT NO. : 10,362,900 B2  
APPLICATION NO. : 15/116720  
DATED : July 30, 2019  
INVENTOR(S) : Leslie Gort-Barten Page 1 of 1

It is certified that error appears in the above-identified patent and that said Letters Patent is hereby corrected as shown below:

On the Title Page

Item (22) PCT Filed, delete "Feb. 16, 2015" and replace with "Feb. 6, 2015"

Signed and Sealed this  
Tenth Day of September, 2019

Andrei Iancu  
*Director of the United States Patent and Trademark Office*